(12) United States Patent
Eylman

(10) Patent No.: US 6,308,521 B1
(45) Date of Patent: Oct. 30, 2001

(54) UNIVERSAL POWER GENERATOR UTILIZING WIND FLOW OF LIQUID FOR THE MANUFACTURING OF WATER FROM HUMID AIR

(76) Inventor: Leonid Eylman, 201 Turk St., #716, San Francisco, CA (US) 94102

( * ) Notice: Subject to any disclaimer, the term of this patent is extended or adjusted under 35 U.S.C. 154(b) by 0 days.

(21) Appl. No.: 09/316,010

(22) Filed: May 21, 1999

(51) Int. Cl.[7] ............................. F25D 17/06; F25D 21/14; F25B 27/00
(52) U.S. Cl. .................................. 62/93; 62/291; 62/236
(58) Field of Search ............................... 62/236, 93, 272, 62/285, 291

(56) References Cited

U.S. PATENT DOCUMENTS

| | | | | |
|---|---|---|---|---|
| 4,256,971 | * | 3/1981 | Griffith | 290/53 |
| 4,371,788 | * | 2/1983 | Smith | 290/42 |
| 4,471,612 | * | 9/1984 | Buels | 60/398 |
| 4,883,823 | * | 11/1989 | Perry et al. | 518/702 |
| 5,324,169 | * | 6/1994 | Brown et al. | 416/83 |
| 5,729,981 | * | 3/1998 | Markus et al. | 62/3.4 |
| 5,929,531 | * | 7/1999 | Lagno | 290/53 |

* cited by examiner

Primary Examiner—William Doerrler

(57) ABSTRACT

The universal power generator utilizing the energy of wind, water stream, or a sea waves for manufacturing clean water from humid air is shown in FIG. 1 by the side 1 and front 11 views.

The above generator contains the following units: swing system which are comprised of the pendulum system (54,56) sail blade systems (2,4,66,68). The sail system is formed of a plurality of blades (a, b, c, d) installed on two frames (4,66), which swing on two horizontal axles (6,8) which are disposed according to the wind direction or the flow of water movement by weather cock system. The tips of the lower blades can be used as paddles.

If the upper blades (a) of the frame (4) and the lower blades (b) of the frame (66) receive any stream of energy then the other blades (c) of the frame (66) and lower blades (d) of the frame (4) move in manner like a weather cock at the same time. At the end of each swing, the blades change their action.

The design of sails blades allows for a simple regular means of cooling humid air in the special air chambers. The above generator produces electro energy for a cooling from natural, clean and renewable sources of energy, therefore water is extracted from humid air at a very low cost. A set of membranes separates a tiny bit of water from humid air in the special water headers.

7 Claims, 4 Drawing Sheets

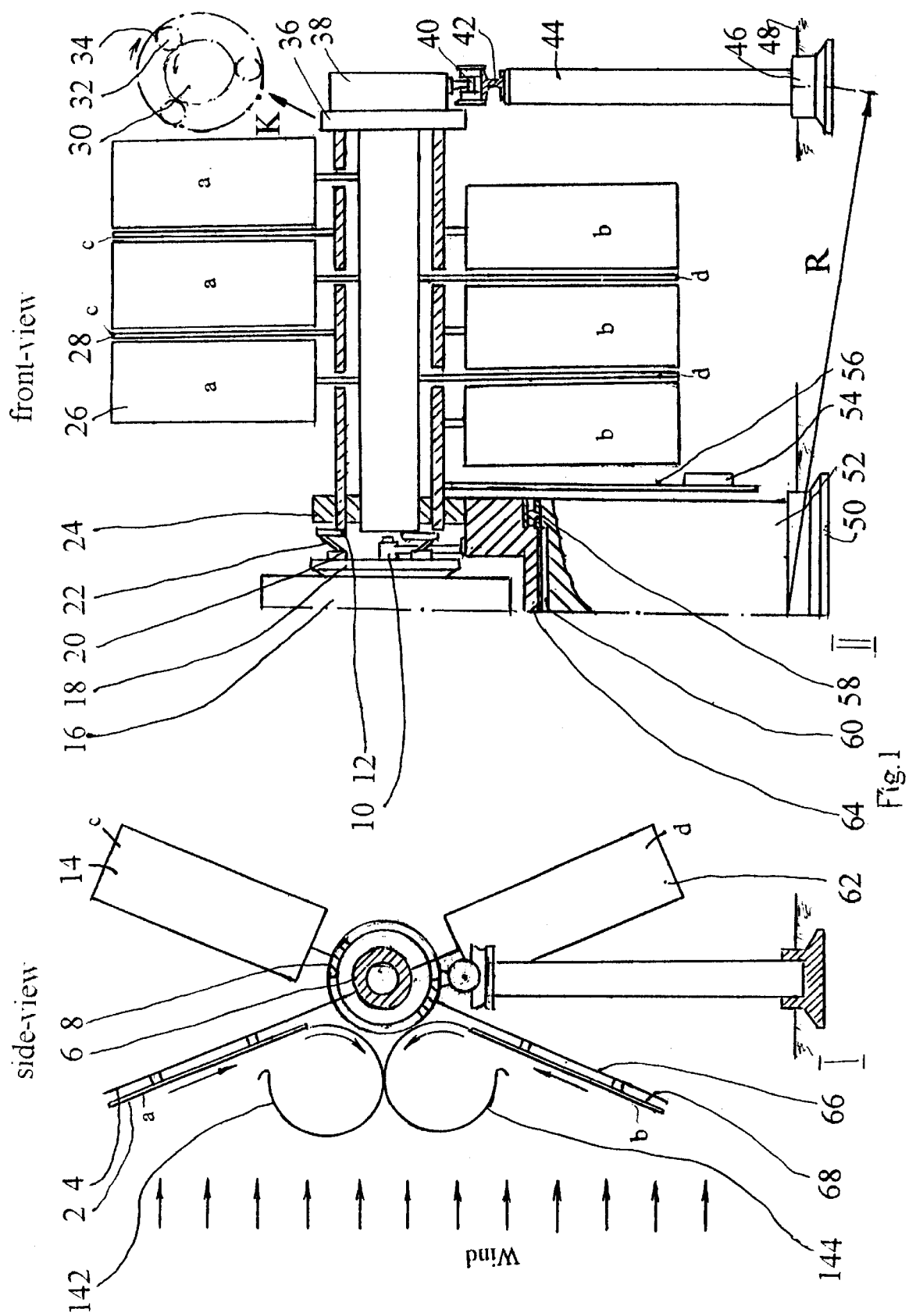

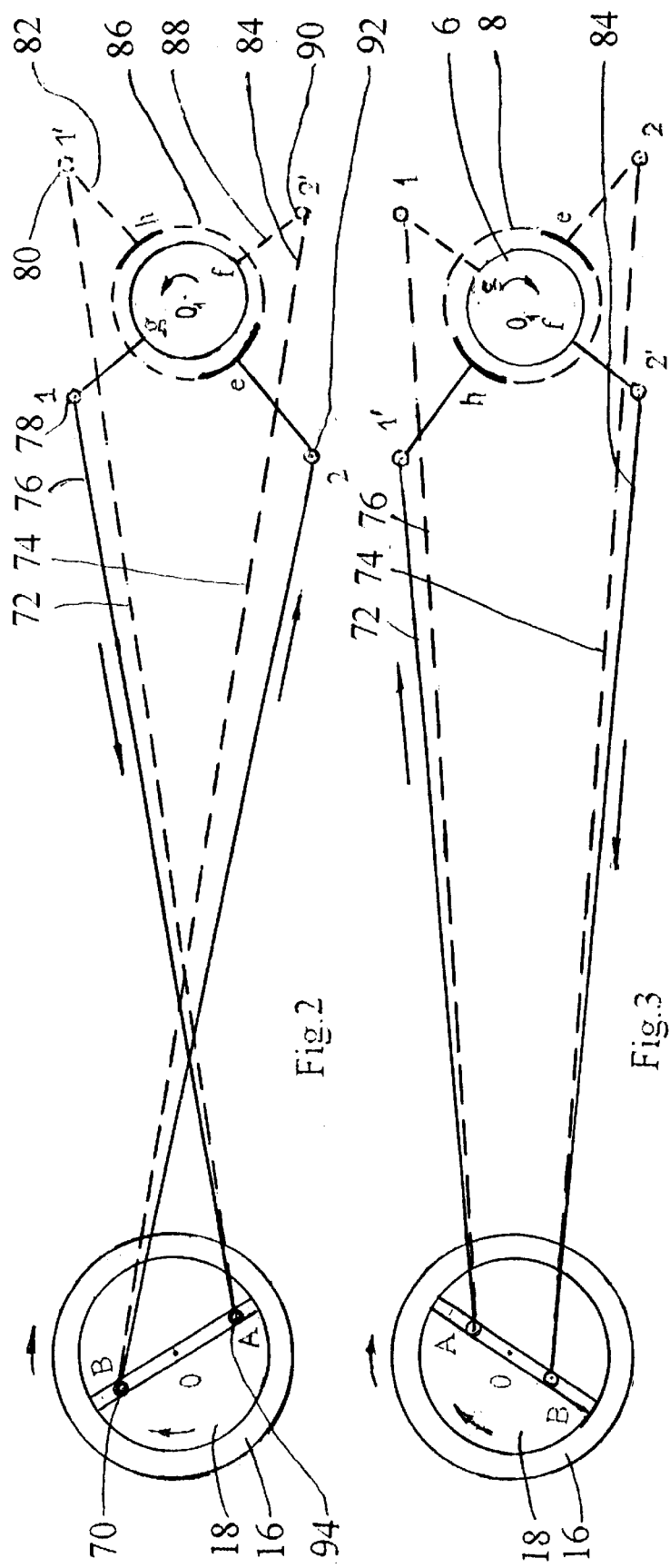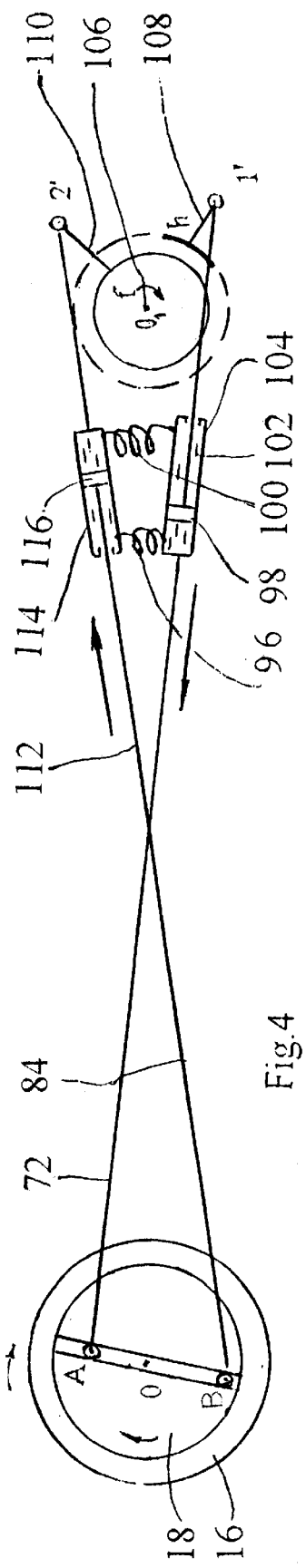

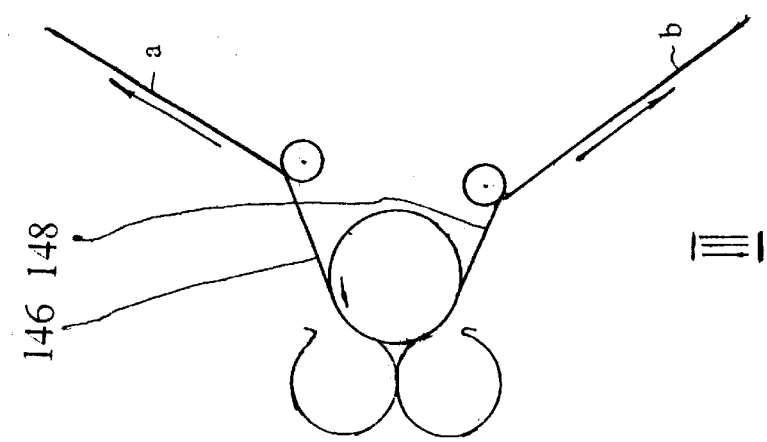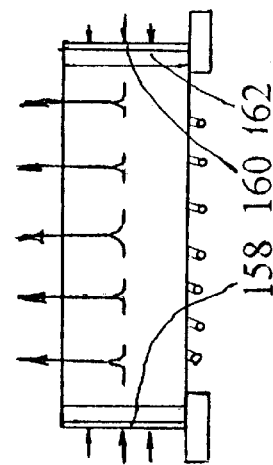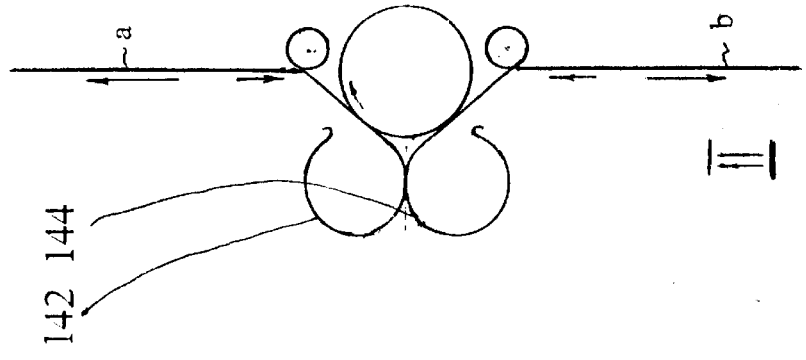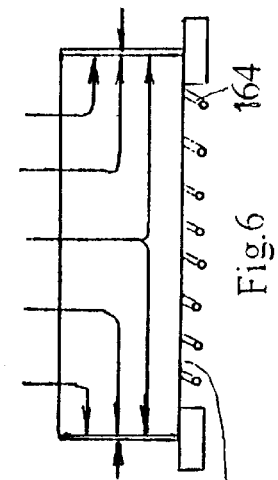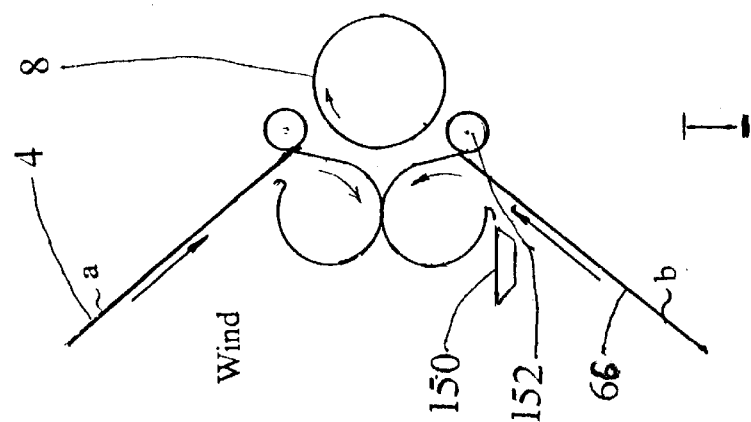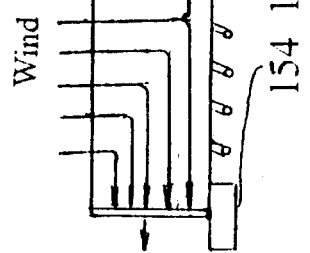
Fig.6

UNIVERSAL POWER GENERATOR UTILIZING WIND FLOW OF LIQUID FOR THE MANUFACTURING OF WATER FROM HUMID AIR

FIELD OF THE INVENTION

The present invention relates to the field of power engineering, particularly to the universal power generator utilizing wind or flow of water energy for manufacturing water from humid air.

DESCRIPTION OF PRIOR ART

Efforts to reduce dependence upon fossil fuels, as well as stringent environmental requirements with regard to air pollution have lead to an increasing demand for efficient and reliable generators of electric power which can operate from wind, energy of waves, and the flow of liquids.

The power generators driven by wind or flow of liquid are known in the art. Such wind turbine generators are described in U.S. Pat. No. 4,545,728 to Marvin Cheney, Jr., November 1985 and etc. This list can be extended to a substantial number of patent and literature sources. What is common amongst all existing power generators driven by wind and flow of liquid is that all of them have an turbine or impeller with different types of blades which are attached to a common axle or shaft. Since the blades in these prior inventions always rotate an acute angle with the direction of wind or flow devices have very low efficiency. In practice the efficiency coefficient is 0.2–0.35. A water wheel is a power generator driven by the flow of liquid. Although generators of this type have existed for centuries, they are bound to locations which have a source of water flow. Also they are not universal and can not use the energy of wind or waves.

A pendulum mechanism is also known as a source of energy, for example, for driving a clock. The pendulum mechanism, however, is not useful for generating electric energy because of the slow speeds of movement of the inductor (i.e. pendulum) with respect to the stator (in which the electric current is to be induced). When the inductor moves with a law speed, the generator can not operate with enough efficiency. U.S Pat. No. 5,009,571, to R. Smith issued Apr. 23, 1991, describes a wind motor driven from a dual-winged sail. The sail is balanced with a counterweight. The oscillations of the sail caused by wind load are transformed into a mechanical rotary motion. As indicated by the author of this patent himself, however, this mechanism may be used only at low wind velocities.

R. Smith's counterbalancing device can not be converted into an universal pendulum system, as the fulcrum point of the lever which supports the sail and the counterweight is situated between said sail and said counterweight. Since the wind load acts on the lever arm to which the sail is attached, the pendulum device is subject to the action not of a force, but of torque, i.e., a product of the force and the arm. This sharply increases dimensions of the pendulum system. When larger wind forces are used, then Smith's pendulum becomes unstable; and the pendulum system loses its main property, which is the stability of operation. This, in turn, results in the loss of the potential for making the system universal, which is central to the universal power generator described in this patent specification.

The R. Smith device can not work in the sail-vane mode and can not be synchronized with a paddle system any kind such as are described in this patent specification. Such device can neither generate high power, utilize strong wind gusts, utilize energies of different intensities, nor be suitable for use as individual components of a universal power system, or to be used as a basis for such a system.

U.S. Pat. No. 578,001 issued on Mar. 2, 1887 C. A. Barron and U.S. Pat. No. 398,070 issued on Dec. 16, 1887 to A. Neynaber describe paddles having a mechanically-driven actuation mechanism which utilizes a force developed by current for useful work. The paddle systems described in these patents are unsuitable for use in combination with a sail-driven pendulum system. They can not fulfil the above-mentioned task for the following reasons: the paddles do not have a common point of suspension from a pendulum and such a point can not be realized in the above-mention system, as they have neither a ratchet mechanism which is necessary for unidirectional force-transmitting action of the paddle, a mechanism for limiting the time during which flow or waves act on the paddle, nor a control system which allows, due to use of the above-mentioned ratchet mechanism. the paddle to move away from the zone of interaction with the waves when the waves are not in agreement with the period of pendulum oscillations.

Although all the above-mentioned power generators, i.e., wind driven, flow of liquid or waves driven, and pendulum driven generators are known per se, a universal unit which can be driven by all of the above-mentioned natural energy sources simultaneously or separately does not exist. Why? Because, for example, a wind mill uses the aerodynamic phenomenon; a wave mill uses the paddle phenomenon, a pendulum mill uses the phenomenon of gravity, to wit different phenomena. In contrast our universal power generator uses the phenomenon common to all natural energy sources: the so-called "impact phenomenon" Impact phenomenon is the phenomenon in physics which describes the exchange in kinetic energy as a result of any impact of any body with any other body (wind and sails; wave and paddle; flow of liquid and immersed blade, and etc.)

In addition, in the universal power generator all single systems are synchronized. Such a synchronized combined operation of all the components produce a synergistic effect which is higher than the mere sum of effects resulting from the operation of all elements.

All elements are indispensable. The removal of any of these single system from the universal power generator will make it impossible to achieve the objectives of the present invention.

It is well known that all renewable natural sources of energy (wind, flow of liquid, waves) have very small specific densities of energy. If we want to create a powerful generator of energy, then we must use the systems that can collect the greatest distribution around a cross-section energy flow.

U.S. Pat. No. 4,471,612, author Mr. Buels, September 1994; U.S. Pat. No. 5,324,169, authors Mr. Brown et al., June 1994; U.S. Pat No. 4,256,971, author Mr. Griffin, March 1986; U.S. Pat. No. 4,371,788, author Mr. Smith, February 1983 do not have a stream energy collector, which could amass a considerable quantity of specific energy. Such a collector can not be embedded in the mechanisms described above for a number of reasons. For example, if the energy collectors increase the size of their shields, then the forces of flow acting on the shields increase as well. The stopping-anchor problem then arises. The need to increase the anchoring ability of the installation will increase as well. Water flow pushes on any installation with great force. The stopping-anchor system then becomes a challenge and requires an expensive solution. Also this reason the use of a regular turbine or impeller of any kind, which can be used for a natural renewable flow energy collection, in practical.

In the universal power generator this problem, is resolved. The sail moves with the flow and the vane (weathercock) moves against the direction of flow, but the vane has a minimal surface in this case, which cuts the flow like a knife. This method solves two main problems: it collects a huge quantity of natural renewable energy with the sail; and minimizes the surface of vane, which moves along the stream against the stream's direction and, as the result, minimizes the necessary anchor forces. In the edge to the front position, a vane turns into sail and in the edge to the back position, a sail turns into a vane Because of the problems presented above, the patents cited above can not solve the main problem: collecting and effectively utilizing the stream energy and doing it in a large enough quantity to make this energy cheap.

U.S. Pat. No. 5,929,531, author Mr. Lango, July 1999 uses the lunar tide effect, which moves the system up and down. This process is a very slow. If we want to use a horizontal force of tide, then the above problems arise.

U.S. Pat. No. 5,729,981, authors Mr. Markus et al., March 1998 describes the method of manufacturing water from a humid air by a chimney current of air. This method is very expensive, because a chimney must be built. If we want to refrigerate humid air by a natural method, then the height of a chimney must be about hundred meters or more. If the chimney is short, then the current of air will be weak, and the wind mills or turbines inside the chimney will not be affected.

There are a lot of methods for producing water from humid air. U.S. Pat. No. 4,883,823, author Mr. Perry et al., November 1989, is one of many similar efforts. This system for manufacturing water occupies a lot of space. The article, which was published in "Revue Generale Thermique", magazine No. 377, May 1993, page 227–235, France, describes a very simple method for producing water from a humid air. As solar energy evaporates sea water, an in-take fan collects humid air into the cooling chamber where water is created by the refrigeration method. An in-take fan and a cooling system use electrical energy from an external source.

The problem common to all is the high price of the produced water. The water product price depends on the quantity of produced water and the amount of electrical energy used. Since price of external electrical energy is too high, the above methods can not be used for industrial goals. The universal power generator does not use external electrical energy.

OBJECT AND ADVANTAGES OF THE INVENTION

It is, therefore, an object of the universal power generator to eliminate the above disadvantages and to provide the universal power generator which can be driven by wind, flow liquid, waves or gravity's effect on a swinging pendulum (a pendulum also can use the energy of the Earth spin, so-called pendulum Fucko).

Another advantage is to provide a system for manufacturing water from humid air. The universal power generator has smaller overall dimensions than a conventional wind mill and can produce a similar amount of power. Still an other object of the invention is to create an uniform frequency of current, since the frequency of the pendulum oscillations are stabilized, and the frequency only depends of the length of the pendulum. Other advantages and features of the invention will become apparent from a consideration of the ensuing description and drawings.

BRIEF DESCRIPTION OF DRAWINGS

FIG. 1 is a general schematic view of the universal power generator and shows the mechanism for converting any flow of energy into a rotation movement of the fly-wheel. (1 is a side view; 11 is a front view)

FIG. 2 is a schema of the movement of the regular crank-link (L-form) mechanism in the forward position.

FIG. 3 is a schema of the movement of the regular crank-link (L-form) mechanism in the afterwards position.

FIG. 4 is a schema of the variable lever length which is controlled by the hydraulic system.

FIG. 6 is a schematic view of a system, which can manufacture water from humid air and shows the direction of the wind by arrows. 1,11,111 are continuity of the positions for the swinging frames 4 and 68.

Figure 5:
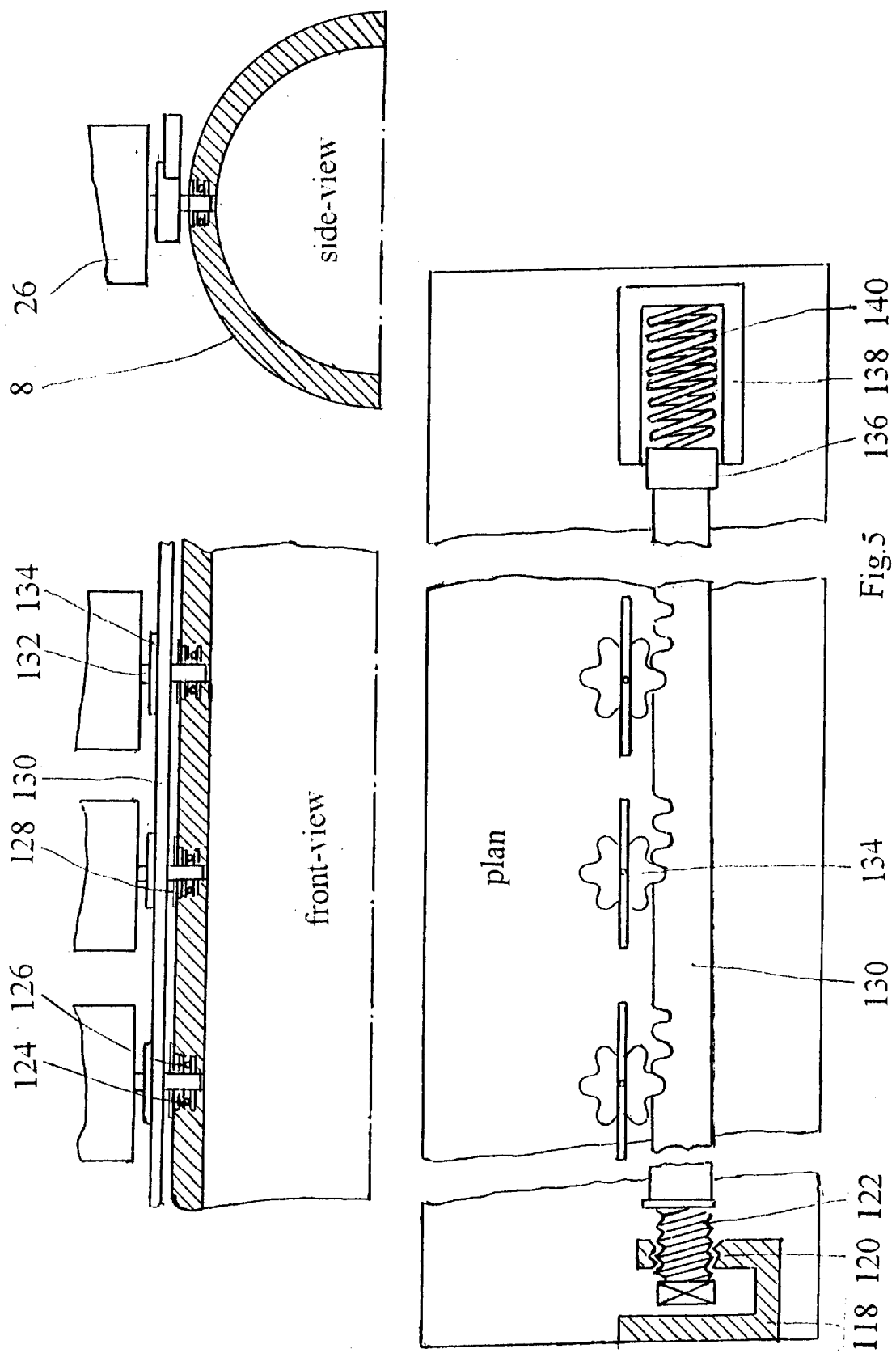
FIG. 5 is a schema of the mechanism for the blades turns.

The List of Details to Universal Power Generator

FIG. 1
2. up blade "a" (side-view)
4. left frame
6. inside tube joint
8. outside tube joint
10. bearing support
12. bearing console
14. up blade "c" (front-view)
16. flywheel
18. clutch disc of flywheel inclusion and link mechanism
20. joint
22. varyable length lever
24. bearing
26. up blade "a" (front-view)
28. up blade "c" (side-view)
30. inner gear or pulley
32. neutral gear or pulley
34. outer gear or pulley
36. synchronizer (see along arrow K).
38. bearing
40. axis and wheels
42. rail arc ("R"-radius)
44. railway column
46. chock
48. level of bottom
50. central chock
52. central column
54. pendulum weight
56. pendulum
58. abutment bearing
60. central mortise
62. down blade "d" (front-view)
64. central shaft
66. down blade "b" (side-view)
68. right frame
  FIG. 2 and FIG. 3
70. joint "B"
72. lever "A-1'"
74. lever "B-2"
76. lever "A-2'"
78. joint "1"
80. joint "1'"
82. lever "1'-h"="e-2"
84. lever "e-2"="1'-h"
86. slot in outside tube
88. lever "f-2'"="1-g"
90. joint "2'"

92. joint "2"
94. joint "A"
  FIG. 4
96. first hydrobrace
98. piston
100. second hydrobrace
102. liquid
104. hydrocylinder of "B-1'" lever
106. Joint center "$O_1$"
108. lever "$O_1$-1"
110. lever "$O_1$-2'"
112. stock
114. hydrocylinder of "A-2'" lever
116. piston
  FIG. 5
118. stop
120. nut
122. screw
124. bearing
126. cap
128. general cap
130. rack
132. shaft
134. gear of turn
136. magnet
138. electromagnet
140. spring for return
  FIG. 6
142. up chamber for refrigeratory of humid air
144. down chamber for refrigeratory of humid air
146. up rubber mat
148. down rubber mat
150. water headers
152. narrow belt bobbin
154. left water header
156. right water header
158. left membrane
160. right membrane
162. wind slides
164. cooling coil

DETAILED DESCRIPTION OF THE SUBJECT

The universal power generator utilizes a combined energy of wind, flow of liquid (for example, ocean stream, sea waves) and solar energy (from the solar cells, which can be fixed on the upper blades "a" and "c". See FIG. 1) is shown in FIG. 1 schematically.

The universal power generator is comprised of a vertical central supporting column 52, which has a bearing 58 and a bracket 10; several columns 44, which are disposed peripherally and which support a railway 42 with the radius R. Two horizontal pivoted tubes, which use as the axle 6 and the axle 8, accordingly. They lie on the bearings 24, 38, which is located between the central column 52 and railway trolley 40 symmetrically.

The sail blades 2 ("a") and 62 ("d") are attached to the tube axle 6. The tube axle 6 and above blades dispose in the frame 4. The sail blades 14 ("c") and 68 ("b") are attached to the tube axle 8. The tube axle 8 and above blades dispose in the frame 66.

The tube axles 6, 8, with corresponding the frames 4, 66, and the pendulum 56 can be swung like a pendulum.

The blades "a" and "b" assume a position perpendicular to the direction of the wind. The wind direction is shown in FIG. 1 by arrows.

In the edge positions of the swing, all blades reverse their positions. For example, at first the blades "a" and "b" are disposed against the wind direction. When the blades "a" and "b" receive the wind pressure then the blades "c" and "d" work as a weather cock (vane). Next the blades "c" and "d" dispose against the wind direction and the blades "a" and "b" are disposed along the wind direction. When the blades "c" and "d" receive the wind pressure then the blades "a" and "b" work as a weather cock (vane). The weather cock system contains the tube axle 6, tube axle 8, pivots; bearing 58, rail are 42 with wheels 40 and the above blade system. The general swing system has the same pivots. The pendulum 56 has a replaceable load 54, which can be moved along the pendulum length and fixed in a required position according to the forces of wind and waves in this time.

The swings of the frame 4, and the swings of the frame 66 and pendulum 56 can be synchronized by the special synchronizer 36 (See arrow K which shows the toothing of gears 30,32,34).

FIG. 2 and FIG. 3 show a crank-link mechanism (L-form mechanism). This mechanism is used for transforming of the swing movements of cranks "1-g", "f-2'" (for inner tube axle 6); "2-e", "h-1'" (for outside tube axle 8) to the spin which moves of the disc friction clutch 18 and, hence, the fly-wheel 16.

FIG. 2 is the schema of the links 22, 72, 74, 76 position in the first motion (the dotted line shows the backward motion) and FIG. 3 is the schema of the same links position in backward motion (the dotted line shows the first motion).

FIG. 4 is the schema of the variable link length crank-link mechanism. The lever "B-1'" (This lever corresponds to regular lever 22 in FIG. 3) contains the first hydraulic mechanism, which has the hydraulic cylinder 104, a piston 98 and a liquid 102. The lever "A-2'"(This lever corresponds to lever 76 in FIG. 3) contains the second hydraulic mechanism, which has the hydraulic cylinder 114, a piston 116 and the same liquid. Both hydraulic cylinders are conjuncted by hydraulic braces 96, 108.

FIG. 5 shows three projections of the turning mechanism for blades "a", "b", "c" and "d". This mechanism is required for changing functions of above blades in the edge position of each swing. Such mechanism contains the rack 130, the gear 134, the bearings 124, the magnet 136, the electromagnet 138 and the spring 140 for pushing the rack 130 on to a back. The electromagnet 138 manages by the relay, which receives the command from a detector of an ending swing movement. But generally the swing system is a pendulum system with stability oscillations. It does not need any special sensors, ordinary timer is enough.

FIG. 6 shows three positions of frames 4 and 66, the schema of the wind direction according to the frame positions, the disposal of the left membrane 158, right membrane 160, water headers 150 and chambers (air vessels) 142, 144. Water forms in up chamber 142 and lower chamber 144.

The universal power generator allows for three different methods of manufacturing water from humid air without outside sources of energy. The first method is created by the common cooling system 164, which is disposal around the air vessels 142, 144. The second method is created by the shift of the standing of sail blades "a" and "b" in the swing. As a result, the wind pressure inside of the air vessels 142 and 144 changes. (See in detail page 12). The third method is the filtration process of the fog, which is created by above two methods or which is brought by the wind. The method uses the membranes 158, 160.

How the Universal Power Generator Acts

It is well known that renewable natural sources of energy all have a very small specific density of energy per cross-section of energy flow. If we want to create a powerful energy generator, then we must use a system that can collect the greatest surface cross-section of flow energy. A sail system is very useful. FIG. 1 shows the sail system of a pendulum type. After each swing, the sail blades "a" and "b" change their function and work as vanes. Vanes blades "c" and "d" also change their function and work as a sails. This method allows energy with a vast surface to be collected and minimizes the energy wastage during the backward movement of the blades.

It is also well known that water flow can push any installation with great force. Because the vane blades have minimal surface and cut the water flow like a knife, the resistance to their movement is minimized. The vanes blades always move against direction of any flow. The forces needed to anchor the installation in the water are small. Thus the power generator may be used in a forceful water flow without the complicated anchor problem for the installation.

Generally wind and waves have similar directions of movement; this direction of flow can be coordinated by wave slides.

The universal power generator contains two swing frames 4 and 66, pendulum 50, which are powered by gravity and the synchronizer 36. The pendulum 50 and the swing frames 4, 66 are unified in one swing system by synchronizer 36. The synchronizer 36 keeps the amplitude of swings of each frame equal. Both frames 4 and 66 have general output shafts, which are connected to an energy receiving unit by the fly wheel 16, clutch 18 and systems of crank-link mechanism (see FIGS. 2, 3, 4).

If there are no friction forces nor other resistors, then the universal power generator pendulums should swing freely by themselves, but we, however, want to create energy to compensate all energy wastage and to produce an extra useful energy. In this case, the amplitude of swings must be sufficient.

Since wind and waves have changing forces (palpitating energy) it is better, if the frame 4 and frame 66 will swing separately. This separate swing can be accomplished by making either frame 4 or 66 shorter than the other frame. The end of the short frame is not long enough to reach the wave in which the installation is immersed. The short frame, therefore, only catches the force of wind. In an instance where, separate swings are desirable, then the synchronizer 36 will increase wastage and should be deactivated. Then the crank-link mechanism must vary a length of link by different methods. In FIG. 4, the hydraulic control system is shown which allows a change in the length of levers 22 and 76, according to the amplitude of the swings. If the angles of swing of the link "A-O" and the link "O-B" are nearly equal, and the amplitudes of swings for the lever "1'-0," and "0-2'" are sometimes different, then the lengths of levers 22 and 76 must be changed. In this system the resistance of water flow 102 is adjusted very well.

BACKGROUND

1. A comparison of the impact system and the aerodynamic regular system.

The general energy E formula for impact system is:

$$E_1 \ 0.5*M*V,$$

where E is energy of the wind or the flow of liquid; M is the mass of air or water and V is the speed of the said mass. If we commute $M=\rho*U*\rho*V*S$, where $\rho$ is a specific weight; U is a volume of wind or water flow per second, therefore U·V*S; S is a cross-section of the wind stream or flow liquid. The full transmission of a kinetic energy $E_1$ to a sail is theoretically possible. Then formula for impact process is:

$$E_1=0.5*\rho*V'*S$$

(if the measurement is in Newtons*m)

$$E_1=0.5*\rho*V'*S/g$$

(if the measurement in kgms: g=9.81 m sec)
The general energy E formula for wind mill:

$$E_2=k*0.5*\rho*V'*S;$$

where k is the efficiency coefficient and in practice k is 0.2–0.35, because the force of wind will splint into two forces, as a result of the aerodynamic phenomenon. One force will produce useful work, the other force can not produce useful work and will damage the wind mill bearing. The full transmission of kinetic energy E to a wind mill is, therefore, theoretically impossible.

Hence, $E_1$ is greater than $E_2$

Though the velocity of ocean flow is generally slow, the specific weight of water is much greater than the specific weight of air about 820 times, therefore, the universal power generator using a huge quantity of water mass is optimum. The comparison of $E_1$ and $E_2$ shows of the great advantage of the impact process.

2. The frequency for a pendulum system.
The period of oscillations T is theoretically constant:

$$T=2*\pi*\sqrt{\sqrt{L/g}},$$

where L is length of the pendulum in meters, m g is 9.81 m $sec^2$.
We can change T by changing the weight 54 center, which can move along the side pole of the pendulum 56 (see FIG. 1)

Possible Methods of Water Production

First Method

In the best known way of producing water from humid air, a humid air must be refrigerated by an ordinary cooling system to the point where a mist is created. See FIG. 6. The up (142) and lower (144) chambers have cooling coils (164). A refrigerant circulates inside of said cooling coils. The unique aspect of this system is: the cooling system does not use any electrical energy from outside source. All electrical energy is produced by the universal power generator.

The Second Method

During a swing, the position of the frames 4, 66 are changed, and the common form of the sail is also changed. A full open sail is in the form of a giant diffuser (V-form). See FIG. 6, position 1. A closed sail is in a pyramid shape streamer. See FIG. 6, position 3. During a swing, the air pressure changes in the area of the rubber mats 146, 148. Such phenomenon can be used to manufacture water from humid air.

In FIG. 6, position 1, the direction of wind is shown by arrows. This wind flow is directed to the input gap of the up chamber 142 and to the input gap of the lower chamber 144. When the wind flow meets a narrow input gap, its pressure increases. The wind flow enters chambers 142 and 144 (air vessels) through the input gaps; the chambers 142, 144 have a cylindrical form, so that the forces of the wind flow result on rotating air, creating an eddy movement. In the center of an eddy movement, the air pressure is lowered. Usually the air pressure is about 0.1 atmosphere in the center of the eddy. This is a well-known phenomenon used in the eddy vacuum pump. Thus the air pressure can be changed about 100 fold from high to low very quickly and a nearly adiabatic widening of the air stream begins. This phenomenon cools the air (Joul-Tomson effect). As a result of the above phenomenon, the water condensation creates. The wind pressure is the product the mass of air and is acceleration. If we increase the surface of the blades "a" and "b" (See FIG. 1, position 1) by lengthening them (width is constant), then the mass of air will be greater and the air pressure will increase accordingly.

Humid air can have a different thermal parameters, and, perhaps, the energy of each method (the first method, the second method) will be not enough to produce water nor extract enough fresh water. Therefore, both methods must act together simultaneously.

The Third Method

The third method is a supplement to the above the first and the second methods. If we fix membranes 158, 160 on the ends of chambers 144, 146 then those membranes can separate tiny water drops from refrigerated humid air. FIG. 6 shows three successive positions of the flow wind by arrows. The first position is a work position, in which eddies are created and in which water drops are formed. In the third position, the direction of the wind is changed; the wind forces the water drops off the surface of the membranes 158, 160 and into chambers 154 and 156.

Note:

The universal power generator described above can utilize the energy of wind, the ocean or river flow energy separately. If the power generator is immersed in the ocean stream and utilizes the ocean flow energy, it obviously cannot extract water from air because the chambers 154, 156 are underwater. It can, however, produce very cheap electro energy, which can, in turn, be used with other methods of distilling cheap fresh water such as, through electrolysis, chemical means, distillation, and so forth. Unfortunately, all the known methods of desalinating salt water are very expensive, because all methods require a huge expenditure of energy. If the universal power generator is immersed in the ocean flow, it must be equipped with a system of pontoons or buoys; the anchoring system and the air vessels 154, 160 are not necessary in this instance and will be omitted. If two or more universal power generators use ocean flow as source of energy, for example, they can be connected together be an electrical system, so that they can supply additional energy to any air cooling system, say, to an installation on land. In this case, the first method of exacting water from air becomes the basic method of the whole interconnected system.

SUMMARY, RAMIFICATION, SCOPE

Although the invention has been shown and described in the form of the specific embodiment, it is understood that their embodiment, their parts, materials and confirmations were given only as examples and many other modifications of the universal power generator for manufacturing of water from humid air are possible. For example, a pendulum can use the spin energy of Earth (Fucko pendulum). When a power generator works as wind mill then solar cells can be fixed on upper sail blades, and it must be equipped by a mirror to direct solar rays to the solar cells. Of course, the described rectangle sail blades can have any form: a disc, quadrate, disc with slots, composed from a several pieces, rotation helix, etc.

A mechanism for transformation the swinging movements of sail pendulum system to spinning movements can differ; a connecting-link mechanism, etc. The universal power generator can be equipped by an accumulation system of any kind, for example, by an electrical accumulator, etc.

The moisture of air can be reinforced in the air vessels by different methods: by a intake fan, which generates a greater quantity of humid air in the air vessels or by using any adsorbent materials, which can be immersed in salt water and brought to the air-vessels by a lift mechanism. Both manipulations should be done sequentially.

Therefore, the scope of the invention should be determined, not by the example given, but by the appended claims and legal equivalents.

What is claimed is:

1. An universal power generator utilizing the energy of the wind or of flow of liquid (river flow) or waves (the ocean) for extracting water from humid air comprised of:

a swing system, which contains a sail system, a pendulum system with a weight, output shafts a synchronizer and means for extracting water from humid air;

said pendulum system rigidly connects to said sail system so that the frequency of swings is stabilized;

a weight attached to said pendulum which can be moved and adjusted;

said sail system is connected to said output shafts and said output shafts are connected to an energy receiving unit;

said synchronizer is a mechanism for synchronizing the movement of said pendulum system and of all sail frames;

a means for converting the amplitude or oscillations or said swing system into the continuous rotation of said output shafts;

a means for the accumulation of energy during oscillations of said swing system;

a means for orienting sail blades in order to catch the wind and maximize the impact of the force of waves or flowing water;

a means for extracting water from humid air, which contains a cooling coil system disposed outside of the air vessels and which refrigerates the humid air inside the air vessels and a set of membranes for separating the tiny water drops from the cooling humid air and fog.

2. The power generator of claim 1 wherein said sail is formed of plurality of blades pivotally installed on two or several frames which swing on the horizontal axles with respect to the wind or flow direction.

3. The universal power generator of claim 1 wherein said means for converting the amplitude of oscillations of said swing system into a continuous rotation of said output shafts comprised of:

a rotating crank-link mechanism which has levers of variable length: some of which vary their length by a hydraulic system or a levers length can be varied by an ordinary connecting-link mechanism, and a flywheel system which accumulates kinetic energy of oscillations and is connected with said crank-link mechanism by a flywheel clutch which causes the flywheel to spin.

4. The universal power generator of claim 1 wherein said means for synchronizing swings of said swing system by gear mechanism with an idler gear or a pulley.

5. The universal power generator of claim 1 wherein said means for orienting said sail system across wind or flow of liquid comprising of: a rack mechanism using for rotating of sail blades and exchanging their positions in the end of each swing, when one part of said sail blades is a receiver of wind or flow of liquid energy, then other part of said sail is a weather cock in the same time. In the end of each swing the blades are exchanged.

6. The universal power generator of claim 1 wherein said means for utilizing energy of flow of liquid for driving said swing system comprises of:
   down blades of said sail system, which are sinked in a flow liquid stream or waves by its bottom parts,
   slides help to direct waves to a surface of blades,
   swing system can be sinked in ocean stream fully, in this case it must be equiped by an anchors and pontoons.

7. The universal power generator of claim 1 wherein said means for extracting water from humid air comprised of:
   air collectors where cycles of air pressure variation are created: when said sail blades are disposed toward the wind in a diffusing (V-shaped) position, then the air pressure increases in the air chambers and inside of chamber tube an air eddy is created, when said sail blades are oriented in a pyramid-shaped position, then the air pressure decreases in the air collectors; as a result of such cycles, a nearly adiabatic widening of the air stream begins.

\* \* \* \* \*